(12) United States Patent
Justiss et al.

(10) Patent No.: US 7,428,613 B1
(45) Date of Patent: *Sep. 23, 2008

(54) SYSTEM AND METHOD FOR CENTRALIZED PARTITIONED LIBRARY MAPPING

(75) Inventors: Steven A. Justiss, Lakeway, TX (US); Linlin Gao, Cedar Park, TX (US); John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 294 days.

This patent is subject to a terminal disclaimer.

(21) Appl. No.: 10/880,360

(22) Filed: Jun. 29, 2004

(51) Int. Cl. *G06F 13/14* (2006.01)
(52) U.S. Cl. .................................. 711/114
(58) Field of Classification Search .................. 711/114, 711/154, 173, 202
See application file for complete search history.

(56) References Cited

U.S. PATENT DOCUMENTS

| | | |
|---|---|---|
| 4,104,718 A | 8/1978 | Poublan et al. |
| 4,430,701 A | 2/1984 | Christian et al. |
| 4,945,428 A | 7/1990 | Waldo |
| 5,214,768 A | 5/1993 | Martin et al. |
| 5,455,926 A | 10/1995 | Keele et al. |
| 5,506,986 A | 4/1996 | Healy |
| 5,546,315 A | 8/1996 | Kleinschnitz |
| 5,546,557 A | 8/1996 | Allen et al. |
| 5,548,521 A | 8/1996 | Krayer et al. |
| 5,568,629 A | 10/1996 | Gentry et al. |
| 5,592,638 A | 1/1997 | Onodera |
| 5,598,385 A | 1/1997 | Mizukami et al. |
| 5,612,934 A | 3/1997 | Dang et al. |
| 5,740,061 A | 4/1998 | Dewey et al. |
| 5,761,503 A | 6/1998 | Fisher |
| 5,764,615 A | 6/1998 | Ware et al. |
| 5,790,852 A | 8/1998 | Salm |

(Continued)

FOREIGN PATENT DOCUMENTS

EP  1 156 408 A1  11/2001

(Continued)

OTHER PUBLICATIONS

Working Draft NCITS T10 Project 999D, "Information Technology—SCSI-3 Medium Changer Commands (SMC)", pp. 1-68, Mar. 4, 1998.

(Continued)

*Primary Examiner*—Kevin L. Ellis
(74) *Attorney, Agent, or Firm*—Sprinkle IP Law Group

(57) ABSTRACT

Embodiments of the present invention provide systems and methods of centralized mapping of media library partitions. According to one embodiment, the present invention can include a first controller connected to a data transport element of a media library and a second controller connected to a media changer of the media library. The first controller can receive a command from a host application based on a media library partition presented to that host and forward the command to the second controller. The second controller can receive the command from the first controller, translate logical addresses referenced in the command to physical addresses and forward the command to the media changer. The second controller, can also prioritize the command on a FIFO basis or according to other prioritization scheme known in the art.

35 Claims, 5 Drawing Sheets

U.S. PATENT DOCUMENTS

| | | | |
|---|---|---|---|
| 5,870,732 | A | 2/1999 | Fisher et al. |
| 5,892,633 | A | 4/1999 | Ayres et al. |
| 5,914,919 | A | 6/1999 | Fosler et al. |
| 5,959,866 | A | 9/1999 | Hanaoka et al. |
| 5,963,971 | A | 10/1999 | Fosler et al. |
| 5,971,281 | A | 10/1999 | Frary et al. |
| 6,031,798 | A | 2/2000 | James et al. |
| 6,041,329 | A | 3/2000 | Kishi |
| 6,041,381 | A | 3/2000 | Hoese |
| 6,044,442 | A | 3/2000 | Jesionowski |
| 6,052,341 | A | 4/2000 | Bingham et al. |
| 6,058,494 | A | 5/2000 | Gold et al. |
| 6,085,123 | A | 7/2000 | Baca et al. |
| 6,185,165 | B1 | 2/2001 | Jesionowski et al. |
| 6,327,519 | B1 | 12/2001 | Ostwald et al. |
| 6,327,594 | B1 | 12/2001 | Van Huben et al. |
| 6,328,766 | B1 | 12/2001 | Long |
| 6,336,172 | B1 | 1/2002 | Day, III et al. |
| 6,356,803 | B1 | 3/2002 | Goodman et al. |
| 6,360,232 | B1 | 3/2002 | Brewer et al. |
| 6,374,241 | B1 | 4/2002 | Lamburt et al. |
| 6,385,706 | B1 | 5/2002 | Ofek et al. |
| 6,425,035 | B2 | 7/2002 | Hoese et al. |
| 6,425,059 | B1 | 7/2002 | Basham et al. |
| 6,480,934 | B1 | 11/2002 | Hino et al. |
| 6,487,561 | B1 | 11/2002 | Ofek et al. |
| 6,493,721 | B1 | 12/2002 | Getchius et al. |
| 6,507,883 | B1 | 1/2003 | Bello et al. |
| 6,507,889 | B1 | 1/2003 | Tsurumaki et al. |
| 6,574,641 | B1 | 6/2003 | Dawson et al. |
| 6,604,165 | B1 | 8/2003 | Terao |
| 6,665,786 | B2 | 12/2003 | McMichael et al. |
| 6,675,260 | B2 | 1/2004 | Torrey et al. |
| 6,715,031 | B2 | 3/2004 | Camble et al. |
| 6,725,352 | B2 | 4/2004 | Goodman et al. |
| 6,725,394 | B1 | 4/2004 | Bolt |
| 6,738,885 | B1 | 5/2004 | Zhang et al. |
| 6,763,419 | B2 | 7/2004 | Hoese et al. |
| 6,772,231 | B2 | 8/2004 | Reuter et al. |
| 6,804,753 | B1 * | 10/2004 | Moody et al. ............... 711/163 |
| 6,839,824 | B2 | 1/2005 | Camble et al. |
| 6,845,431 | B2 | 1/2005 | Camble et al. |
| 6,950,723 | B2 | 9/2005 | Gallo et al. |
| 7,136,988 | B2 | 11/2006 | Gallo |
| 7,199,809 | B1 | 4/2007 | Lacy et al. |
| 2001/0020197 | A1 | 9/2001 | Nakano et al. |
| 2002/0004883 | A1 | 1/2002 | Nguyen et al. |
| 2002/0019863 | A1 | 2/2002 | Reuter et al. |
| 2002/0144048 | A1 | 10/2002 | Bolt |
| 2002/0169521 | A1 | 11/2002 | Goodman et al. |
| 2002/0188592 | A1 | 12/2002 | Leonhardt et al. |
| 2002/0199077 | A1 | 12/2002 | Goodman et al. |
| 2003/0014585 | A1 | 1/2003 | Ji |
| 2003/0070053 | A1 | 4/2003 | Gallo et al. |
| 2003/0084240 | A1 | 5/2003 | Torrey et al. |
| 2003/0126360 | A1 | 7/2003 | Camble et al. |
| 2003/0126361 | A1 | 7/2003 | Slater et al. |
| 2003/0126362 | A1 | 7/2003 | Camble et al. |
| 2003/0126395 | A1 | 7/2003 | Camble et al. |
| 2003/0126396 | A1 | 7/2003 | Camble et al. |
| 2003/0126460 | A1 | 7/2003 | Camble et al. |
| 2003/0131157 | A1 | 7/2003 | Hoese et al. |
| 2003/0131253 | A1 | 7/2003 | Martin et al. |
| 2003/0135580 | A1 | 7/2003 | Camble et al. |
| 2003/0212873 | A1 | 11/2003 | Lee et al. |
| 2003/0221054 | A1 | 11/2003 | Wu |
| 2004/0044828 | A1 | 3/2004 | Gibble et al. |
| 2004/0044871 | A1 | 3/2004 | Weber et al. |
| 2004/0054838 | A1 | 3/2004 | Hoese et al. |
| 2004/0064641 | A1 | 4/2004 | Kodama |
| 2004/0088513 | A1 | 5/2004 | Biessener et al. |
| 2004/0107300 | A1 | 6/2004 | Padmanabhan et al. |
| 2004/0111580 | A1 | 6/2004 | Weber et al. |
| 2004/0133915 | A1 * | 7/2004 | Moody et al. ............... 725/86 |
| 2004/0139094 | A1 * | 7/2004 | Tyndall et al. ............ 707/100 |
| 2004/0139240 | A1 | 7/2004 | DiCorpo et al. |
| 2004/0139260 | A1 | 7/2004 | Steinmetz et al. |
| 2004/0148460 | A1 | 7/2004 | Steinmetz et al. |
| 2004/0148461 | A1 | 7/2004 | Steinmetz et al. |
| 2006/0069844 | A1 | 3/2006 | Gallo et al. |
| 2006/0149919 | A1 | 7/2006 | Arizpe et al. |

FOREIGN PATENT DOCUMENTS

| | | |
|---|---|---|
| WO | WO 02/27463 A2 | 4/2002 |
| WO | WO03/104971 A1 | 12/2003 |

OTHER PUBLICATIONS

Working Draft INCITS T10 Project 1383D, "Information Technology—SCSI Media Changer Commands-2 (SMC-2)", pp. i-x and 1-58, Nov. 18, 2003.

International Search Report for PCT/US 03/35824, Dec. 6, 2004.

International Search Report for PCT/US 03/35822, Dec. 6, 2004.

U.S. Patent Office Official Action issued Jul. 5, 2007 in U.S. Appl. No. 11/046,066, Justiss et al.

U.S. Patent Office Official Action issued Jun. 28, 2007 in U.S. Appl. No. 11/045,443, Justiss et al.

Office Action dated Feb. 01, 2008 issued in U.S. Appl. No. 10/740,265.

Office Action dated Jan. 28, 2008 issued in U.S. Appl. No. 11/046,019.

Griswold, "Storage Topologies", [online] pp. 1-8, downloaded from internet www.crossroads.com/Library/CollateralDownloads.asp on Jul. 27, 2007, Dec. 2002.

SGI - OpenVault Glossary of Terms, [online] pp.1-8, downloaded from Internet: www.sgi.com/products/software/openvault/glossary/html on Jul. 27, 2007, 1993-2007, source SGI.

Tape Solutions: Router vs. Native Fibre Channel, Crossroads White Paper, pp. 1-7, Doc. Version #001, Crossroads Systems, Inc., Apr. 29, 2002.

\* cited by examiner

US 7,428,613 B1

SYSTEM AND METHOD FOR CENTRALIZED PARTITIONED LIBRARY MAPPING

TECHNICAL FIELD OF THE INVENTION

Embodiments of the present invention relate to the field of data storage. More particularly, embodiments of the present invention relate to systems and methods for centralized mapping of partitioned libraries.

BACKGROUND OF THE INVENTION

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a Fibre Channel to SCSI routing device), the tape libraries may be further addressed by bus number.

Media libraries, such as tape and optical libraries, can range from small "auto loader" devices with a single media drive unit and a number of storage volumes to large libraries comprised of several dozen media drive units and hundreds, if not thousands of storage volumes. Some prior art media libraries include a single embedded controller to present the associated media library to other computers as a number of distinct smaller media libraries. These "partitioned libraries" may have some subset of the physical library's media drives, storage elements and import/export elements allocated to them, while sharing certain other physical library components such as media transport elements. Generally, the allocated elements have logical addresses assigned that must be mapped to actual physical addresses.

FIG. 1 illustrates one embodiment of a prior art media library system 100. System 100 includes multiple hosts 102a-102e connected via a storage area network (SAN) 105 and storage router 107 to media library 110. Media library 110 is typically a variation of a SCSI media changer, which generally contains at least one media changer 115 with an associated medium transport element 120 (alternatively referred to as a "robot" or "picker"), multiple storage elements 125 that can store storage volumes (e.g., tape cartridges, optical disks), and multiple data transport elements (drives) 130. Media library 110 can also have import/export elements 135. The media changer 115 is often a microprocessor based embedded controller that controls medium transport element 120. Medium transport element 120 physically moves storage volumes from one changer element to another. For example, medium transport element 120 can move a storage volume from a storage element to a data transport element in response to a "Move Medium" command.

In a partitioned library, a large, multi-storage element, multi-data transport element, multi-import/export element unit is represented to applications running on hosts (e.g., hosts 102a-102e) as a number of different smaller libraries, each with some allocated number of storage elements, some allocated number of data transport elements, and some number of allocated import/export elements. Each host may see a different media library that represents some subset of media library 110. Thus, for example, applications running on host 102a may see a different media library than other applications running on host 102a or applications running on host 102e.

Access to the physical media library, in these prior art systems is typically provided by a single device, such as storage router 107. Storage router 107 can maintain the media library partitions, as for example, as set of logical to physical mappings, and present the host applications with the appropriate media library partitions. Each host application can then form commands based on the media library partition presented to it. Storage router 107 can map the commands to the appropriate physical addresses and forward the commands to media library 110.

As the rates at which tape drives and other media drives can read/write data increases, providing access through a single storage router or other controller can be insufficient because the device providing access to the media library can act as a bottleneck, slowing the amount of data that can be written to a storage medium. Therefore, a need exists for a system that can provide access to a media library through multiple controllers.

SUMMARY OF THE INVENTION

Embodiments of the present invention provide a system and method of media library access that eliminates, or at least substantially reduces, the shortcomings of prior art media library access systems and methods. More particularly, embodiments of the present invention provide systems and methods of centralized mapping of media library partitions. According to one embodiment, the present invention can include a first controller connected to a data transport element of a media library and a second controller connected to a media changer of the media library. The first controller can receive a command from a host application based on a media library partition presented to that host and forward the command to the second controller. The second controller can receive the command from the first controller, translate a logical address referenced in the command to a physical address and forward the command to the media changer. The second controller can also prioritize the command on a FIFO basis or according to other prioritization scheme known in the art.

Another embodiment of the present invention can include a plurality of storage routers. Each storage router from the plurality of storage routers can be connected to a data transport element of a media library and receive commands directed to a media changer based on a media library partition, and forward the command to another storage router. This embodiment of the present invention can also include an additional storage router connected to the media changer of the media library and each of the plurality of storage routers. The additional storage router can be configured to receive forwarded commands directed to the media changer from each of the plurality of storage routers, map logical addresses in the command to physical addresses and communicate the commands to the media changer.

Yet another embodiment of the present invention can include a method comprising receiving a command directed to a media changer based on a media library partition at a first controller, forwarding the command from the first controller to a second controller, translating logical addresses in the command to physical addresses and forwarding the command from the second controller to the media changer. This embodiment of the present invention can further include prioritizing commands at the second controller.

Yet another embodiment of the present includes a computer program device for media library mapping comprising a set of software instructions stored on one or more computer readable media, wherein the software instructions are executable by one or more processors to receive a command based on the media library partition, wherein the command is directed to a media changer, forward the command to a second controller, translate logical addresses in the command to physical addresses at the second controller and forward the command to the media changer.

Another embodiment of the present invention includes system comprising a media library that has a plurality of data transport elements and a media changer; a plurality of storage area networks; and a plurality of storage routers. Each of the plurality of storage routers can be connected to a storage area network from the plurality of storage area networks, a data transport element from the plurality of data transport elements and a control network. Moreover, each of the plurality of storage routers can be configured receive a command directed to the media changer based on a library partition via the storage area network to which it is connected and forward the command to another storage router via the control network. Additionally, the system can include an additional storage router connected to the control network and connected to the media changer. The additional storage router can be configured to receive commands directed to the media changer via the control network from the plurality of storage routers, translate logical addresses in the commands to physical addresses and forward the commands to the media changer on a FIFO basis.

Embodiments of the present invention provide an advantage over prior art media library partitioning systems and methods by allowing commands directed to a media changer to be received at multiple controllers.

Embodiments of the present invention provide yet another advantage over prior art media library partitioning system and methods by eliminating or reducing the data throughput bottlenecks caused by having only one routing device connected to the media library.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of the various drawings.

Embodiments of the present invention provide systems and methods of centralized mapping of a media library. Embodiments of the present invention can include multiple controllers that connect with a media library. Each controller connected to a data transport element (e.g., a drive) can present a library partition to a host application. When a controller receives a command directed to a media changer based on the library partition, the controller can forward the command to a controller that is connected to the media changer. The controller connected to the media changer can translate logical addresses in the command to physical addresses and forward commands to the media changer. It should be noted that the term "connected" means to allow data communication, including through electrical, optical opto-electrical and other connections known in the art.

Figure 2:
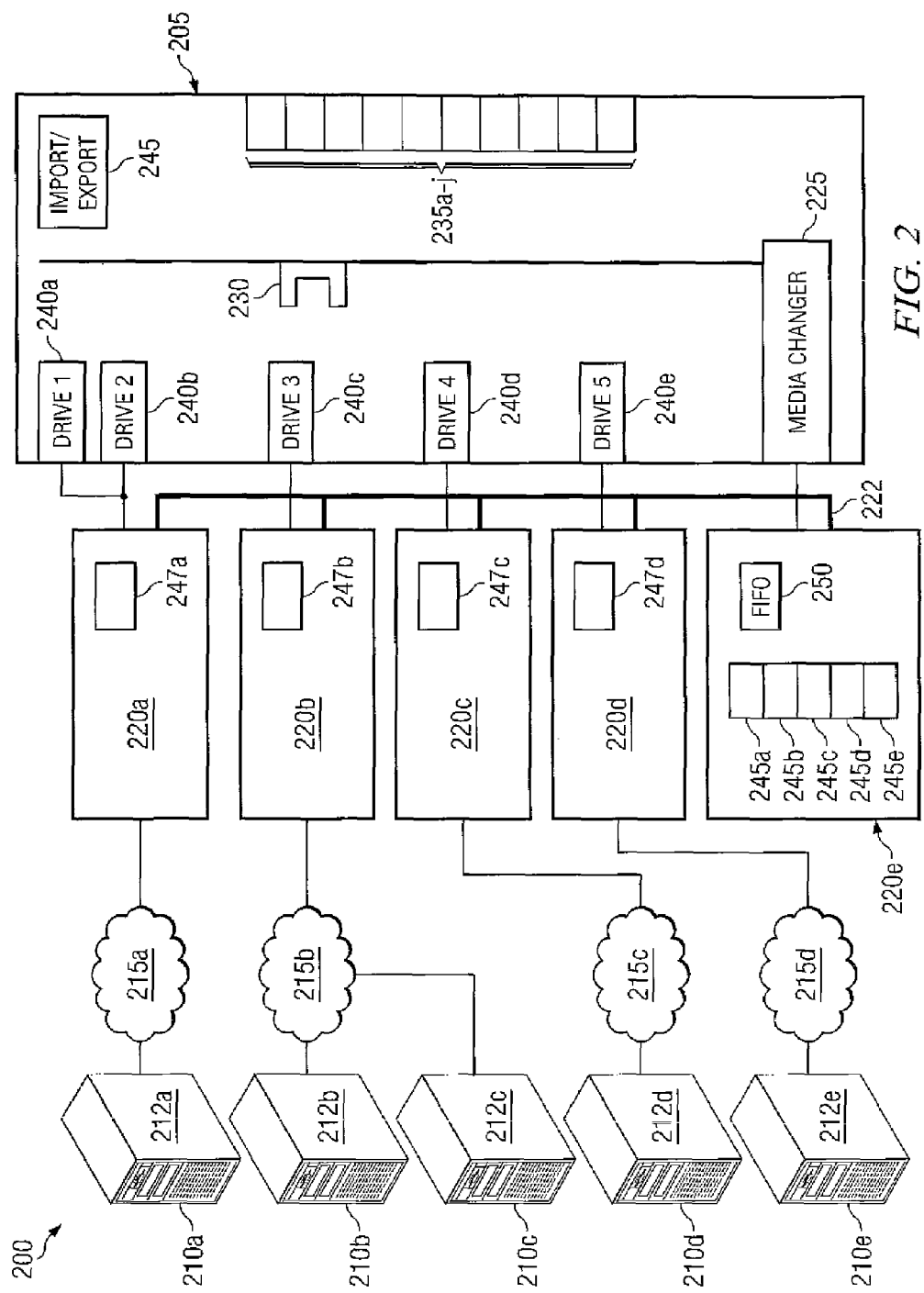
FIG. 2 is a diagrammatic representation of a system in which a number of hosts have access to a media library through various networks according to one embodiment of the present invention.

FIG. 2 is a diagrammatic representation of a system 200 in which a number of hosts have access to a media library 205 through various networks (i.e., data transport media) according to one embodiment of the present invention. In this embodiment, host 210a is connected to media library 205 via network 215a and controller 220a, hosts 210b and 210c are connected to media library 205 via network 215b and controller 220b, host 210d is connected to media library 205 via network 215c and controller 220c and host 210e is connected to media library 205 via network 215d and controller 220d. Each host can run one or more host applications (represented by host application 212a-e) configured to access a media library. Network 215, according to one embodiment of the present invention, can be a storage area network ("SAN"), operating according to any data communication protocol known in the art, including SCSI, iSCSI, Fibre Channel, serial attached SCSI ("SAS"), advanced technology attachment ("ATA"), serial ATA ("SATA") or other protocol known in the art. In other embodiments of the present invention, each network 215 can be the Internet, a LAN, a WAN, a wireless network or any other communications network known in the art. Media library 205 can communicate with each controller 220 according to protocols including, but not limited to, SCSI, iSCSI, Fibre Channel, SAS, ATA, SATA or other protocol known in the art. Controllers 220 can also communicate with each other via a control network 222 that can operate according any protocol known in the art.

Each controller 220 can include, for example, one or more communications interfaces to connect to media library 205 and to one or more other data transport mediums, such as a network (e.g., a SAN and/or a control network), processors and computer readable memories (RAM, ROM, magnetic disk, optical disk and/or other computer readable memory known in the art) that can store software instructions. The software instructions can be executable to control access by hosts on the respective network to media library 205.

According to one embodiment of the present invention, each controller 220 can be implemented as a storage router with software and/or hardware programming. For purposes of this application a storage router is any device that routes or manages data to and from storage devices, hosts and/or both, including, but not limited to SAN storage appliances, NAS storage appliances, RAID controllers, HBAs and other devices that can route/process storage related commands. Each storage router can be, for example, a Fibre Channel to SCSI routing device; Fibre Channel to Fibre Channel routing device; SCSI to SCSI routing device; iSCSI to iSCSI routing device; Fibre Channel to iSCSI routing device; iSCSI to Fibre Channel routing device; iSCSI to SCSI routing device; SCSI to iSCSI routing device; Fibre Channel to Infiniband routing device; Infiniband to Fibre Channel routing device; iSCSI to ATA routing device; ATA to iSCSI routing device; iSCSI to SATA routing device; Serial ATA to iSCSI routing device; Fibre Channel to Serial Attached SCSI routing device; Serial Attached SCSI to Fibre Channel routing device; iSCSI to Serial Attached SCSI routing device; Serial Attached SCSI to iSCSI routing device; Fibre Channel to ATA routing device; ATA to Fibre Channel routing device; Fibre Channel to SATA routing device; SATA to Fibre Channel routing device; Fibre Channel to Serial SCSI Architecture routing device; Serial SCSI Architecture to Fibre Channel routing device; Infiniband to Serial Attached SCSI routing device; Serial Attached SCSI to Infiniband routing device. An example of a storage router includes the Crossroads 10000 storage router, manufactured by Crossroads Systems, Inc. of Austin, Tex. Controllers 220 can communicate with each other and other devices or computers on a control network 222, such as a TCP/IP network or other network known in the art.

Media library 205 can include media changer 225 with an associated medium transport element 230 (alternatively referred to as a "robot" or "picker"), multiple storage elements 235 (in this case, storage elements 235a-j) that can store storage volumes (e.g., tape cartridges, optical disks), data transport elements (drives) 240a-e and one or more load (import/export) elements 245. The media changer 225 can control medium transport element 230. Medium transport element 230 physically moves storage volumes from one element to another. For example, medium transport element 230 can move a storage volume from a storage element to a data transport element in response to a "Move Medium" command. In the case of a tape library, this can involve moving a tape cartridge from a slot to a drive so that data can be written to the magnetic tape in the cartridge.

Media library 205 can be represented to hosts 210 as one or more partitions. When a host application searches a network for available media libraries, the controller controlling access to the media library for that host can make a media library partition available to the host application that represents a portion or all of a larger media library.

Figure 1:
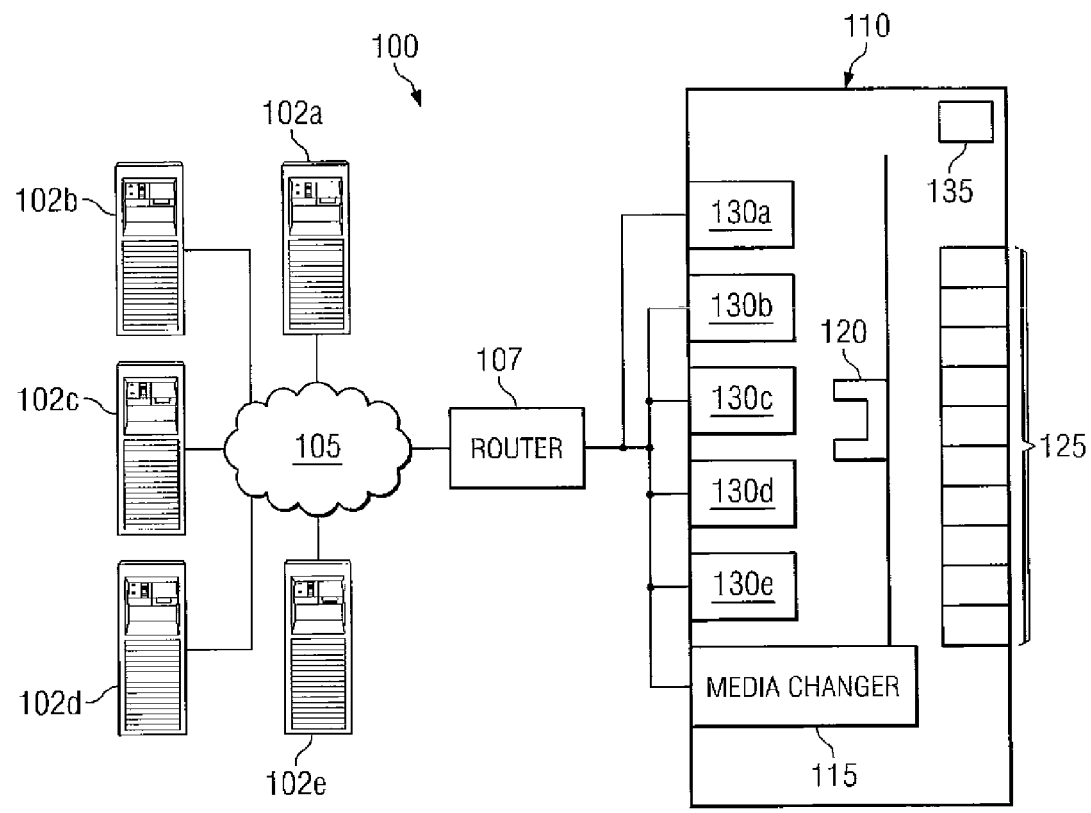
FIG. 1 is a diagrammatic representation of one embodiment of a prior art media library system.
Figure 3:
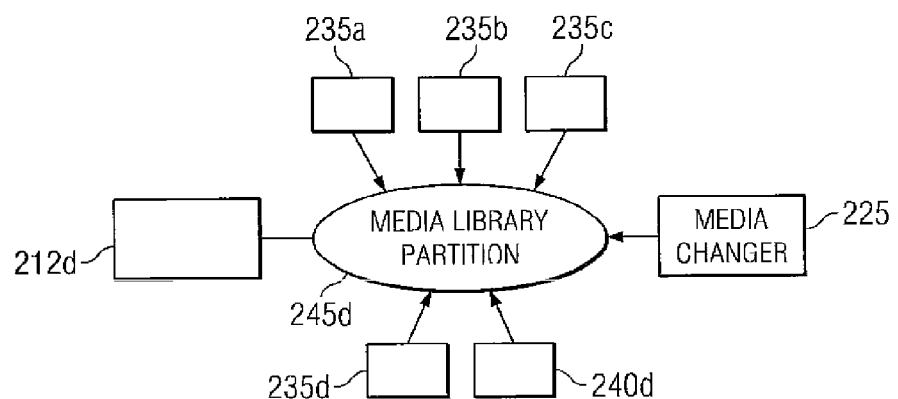
FIG. 3 is a diagrammatic representation of a physical to logical conversion for a media library partition according to one embodiment of the present invention.

Turning briefly to FIG. 3, FIG. 3 is a diagrammatic representation of an example of the physical to logical conversion for a media library partition, such as media library partition 245d, according to one embodiment of the present invention. Media library partition 245d can include storage elements 235a-c and 235d, data storage element 240d and media changer 225, and thus represents a portion of the larger media library 205 of FIG. 2. According to one embodiment of the present invention, the data storage elements associated with partitioned media library 245d are not available in any other media library partition.

Media library partition 245d can be maintained as a table of addresses. In the example in which the partitioned media library is a SCSI media library, media library partition 245d can be maintained as a table of target numbers and LUNS for physical drives and physical robots and a table of element numbers for the slots and drives of the physical media library. Table 1 is an example of a table that can be maintained to represent a partitioned media library by a controller controlling access to the physical media library.

TABLE 1

| Logical Target | Logical LUN | Logical Element | Physical Target | Physical LUN | Physical Element | Corresponding Physical Drive/Slot/Robot |
|---|---|---|---|---|---|---|
| 1 | 3 | 1 | 1 | 2 | 3 | Drive 240d |
| 1 | 1 |   | 1 | 0 |   | Media Changer 225 |
| 1 |   | 2 | 1 |   | 4 | Storage element 235a |
| 1 |   | 3 | 1 |   | 5 | Storage element 235b |
| 1 |   | 4 | 1 |   | 6 | Storage Element 235c |
| 1 |   | 5 | 1 |   | 7 | Storage Element 235d |

Table 1 can include additional data, such as an associated host, a SCSI bus number or any other information used to maintain a partitioned media library as would be understood by those in the art. The data for Table 1 can be maintained as a table, multiple tables, a file, a database or in any other format known in the art. Table 1 is provided by way of example only and any addressing information sufficient to route commands to appropriate media changer can be used.

Returning to the example of FIG. 2, multiple media library partitions can be maintained by controller 220e for host applications. For example, controller 220e can maintain media library partition 245a for host application 212a, media library partition 245b for host application 212b, media library partition 245c for host application 212c, media library partition 245d for host application 212d and media library partition 245e for host application 212e. Each media library partition represents a host application's view of media library 205. The media library partitions can be maintained as one or more tables or according to any storage scheme known in the art.

Each controller 220a-d can include software programming (represented by 247a-d) to present the media library partitions available to corresponding host applications as logical storage element, data transport element and media changer addresses, as would be understood by those in the art. Each controller 220a-d can maintain all the information for the appropriate media library partitions or only the information necessary to present the media library partition to a host and map commands to the data transport element. Using the example media library partition of FIG. 3, if host application 212d performs discovery on network 215c to find available media libraries, controller 220c can present media library partition 245d having logical addresses for storage elements 235a-c and 235d, data transport element 240d and media changer 225. If media library 205 is a tape library, host application 212d will consequently see an available tape library with one drive at LUN 3 and position 1, a media changer at LUN 1, and four cartridge slots at positions 2-5.

For commands directed to a data transport element, a controller can translate the command and forward the command to the appropriate data transport element. For example, if media library partition 245d is associated with host application 212d, controller 220c can maintain at least a portion of the data in Table 1 such that if controller 220c receives a command directed to LUN 3, it can map the command to LUN 2 and forward the command to drive 240d.

For commands directed to the media changer, on the other hand, the controller receiving the command (e.g., controller 220c) can forward the command to the controller connected to the media changer (e.g., controller 220e). Continuing with the previous example, if host application 212d wishes to move a cartridge from storage element 235a to drive 240d, it will issue the command to the media changer at LUN 1 to move the cartridge from storage element 2 and load it in data transport element 1. Controller 220c can forward the command directed to the media changer at LUN 1 to controller 220e for forwarding to media changer 225.

Controller 220e, in turn, can map the logical addresses referenced by the command to the physical addresses of media library 205. Thus, for example, controller 220e can map the command received from controller 220c to LUN 0, the storage element at position 4, and the data transport element at position 3 according to Table 1 above. In other words, the command issued by host application 212c to LUN 1 to move a storage volume from the storage element at position 2 to the data transport element at position 1 will be mapped to media changer 225 at LUN 0 to move the storage volume from the storage element at position 4 to the data transport element at position 2 of the physical media library 205. Thus, commands directed to media changer 225 based on the library partition (i.e., based on the logical or physical addresses provided to the host application) can have their logical addresses translated to physical addresses at controller 220e. These commands can then be forwarded to media changer 225.

In many media libraries there is only one or a limited number of robots. Therefore, a media changer (e.g., media changer 225) can not handle concurrent commands or may only handle a few concurrent commands. Controller 220e, on the other hand, may receive many commands directed to media changer 225 from controllers 220a-d. Controller 220e can, therefore, prioritize commands to media changer 225. According to one embodiment of the present invention, controller 220e can maintain a FIFO buffer 250 for commands directed to media changer 225. In other embodiments of the present invention, other prioritization schemes can be employed, such as giving priority to commands from a particular other controller 220. Thus, controller 220e acts to serialize commands directed to media changer 225. It should be noted that controller 220e can also interface with one or more data transport element and receive commands directly from hosts.

In the example of FIG. 2, mapping of library partitions is centralized at controller 220e. Configuration of the library partitions can include specifying logical LUNS for media changer 225 and allocating storage elements to each library partition. The allocation of storage elements to a library partition may include designation of logical addresses for those elements. Alternatively, there may be no logical addresses presented by a particular controller 220, so that a host is presented with the actual physical addresses of media changer 225 and the storage elements. A host can also be presented with a mix of logical and physical addresses.

Partitioning configuration can also include allocating data transport elements to each partitioned library. The designation of tape drives may include allocation of one or more tape drives connected to a particular controller 220 (e.g., by a SCSI bus or other data transport medium) or allocation of tape drives from a "virtualized pool" of tape drives. Such a "virtualized pool" of tape drives can be instantiated if the data transport interconnect between the controllers 220 and the tape drives is, for example Fibre Channel. A "pool" of drives can then be shared amongst the controllers 220 via the Fibre Channel fabric. As with storage elements, data transfer elements can be presented to hosts with logical or physical addresses. Partitioning configuration can further include, for example, allocation of import/export elements to each partitioned library. The import/export elements, as with storage and data transport elements, may or may not be assigned logical addresses.

Figure 4:
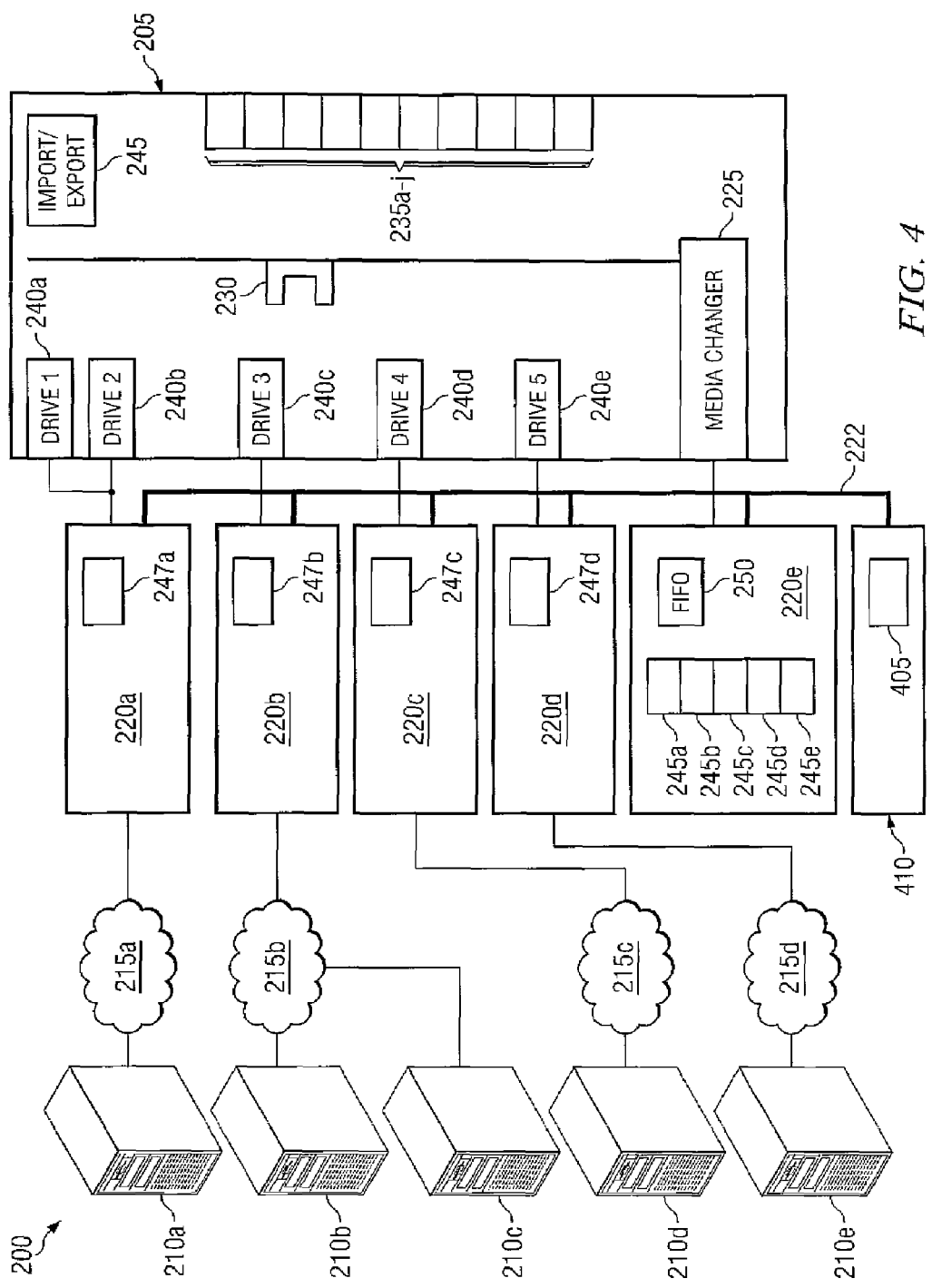
FIG. 4 is a diagrammatic representation of a system in which a number of hosts have access to a media library through various networks according to another embodiment of the present invention.

According to one embodiment of the present invention, a library administrator can configure one of the controllers 220, such as controller 220e, with the library partitions. Configuration can be performed via a graphical, control line or other interface using a library control application. In yet another embodiment of the present invention, as illustrated in FIG. 4, configuration can be performed for example using a library control application 405 residing on an administrative computer 410. The administrative computer 410 can be connected to controllers 220a-e via control network 222. The library partitions can be uploaded from administrative computer 410 to controller 210e and/or controllers 201a-d.

Figure 5:
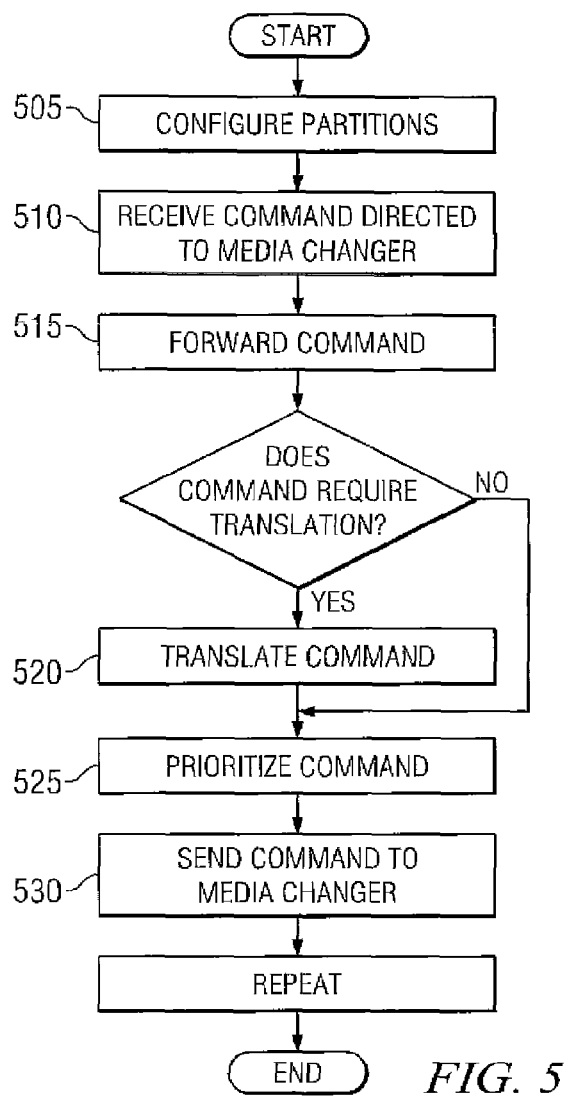
FIG. 5 is a flow chart for a method for distributed partitioned library mapping according to one embodiment of the present invention.

FIG. 5 is a flow chart illustrating a method for centralized partitioned library mapping according to one embodiment of the present invention. The process of FIG. 5 can be performed, in one embodiment of the present invention, through execution of computer instructions. The computer instructions can be distributed across computer readable media and can be executed by one or more processors at, for example, one or more of the controllers 220 of FIG. 2.

According to one embodiment of the present invention partitioning configuration can be performed at step 505. Configuration of partitions can include providing logical to physical mappings for the media changer, storage elements, import/export elements and data transport elements.

At step 510, a controller can receive a command directed to a media changer based on a media library partition and, at step 515, can forward the command to a second controller responsible for sending commands to a media changer. The second controller, at step 520, can translate any logical addresses in the command to physical addresses based on the appropriate media library partition. At step 525, the controller can prioritize the command according to any prioritization scheme known in the art (e.g., FIFO, LIFO or other arbitrarily defined prioritization scheme). The second controller, at step 530, can forward the command to the media changer. The process of FIG. 5 can be arbitrarily repeated as needed or desired.

Figure 6:
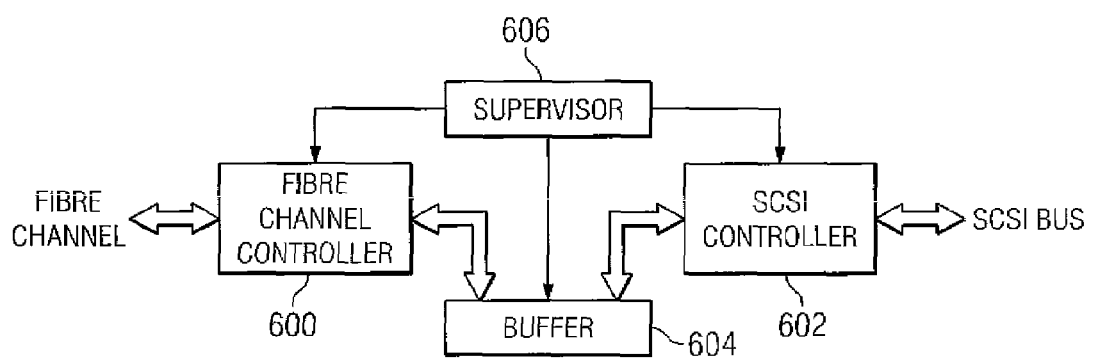
FIG. 6 is a diagrammatic representation of an embodiment of a storage router that can control access to a media library.

FIG. 6 is a diagrammatic representation of one embodiment of storage router which can control access to a media library. The storage router can comprise a first transport medium controller 600 that interfaces with a first transport medium and a second transport medium controller 602 that interfaces with a second transport medium. In one embodiment of the present invention, the first transport medium can be a Fibre Channel transport medium, the second transport medium a SCSI bus, controller 600 a Fibre Channel controller and controller 602 a SCSI controller. In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols.

A buffer 604 provides memory work space and is connected to both Fibre Channel controller 600 and SCSI controller 602. A supervisor unit 606 is connected to Fibre Channel controller 600, SCSI controller 602 and buffer 604. Supervisor unit 606 comprises a microprocessor for controlling operation of the storage router, handling mapping and performing other functions.

Figure 7:
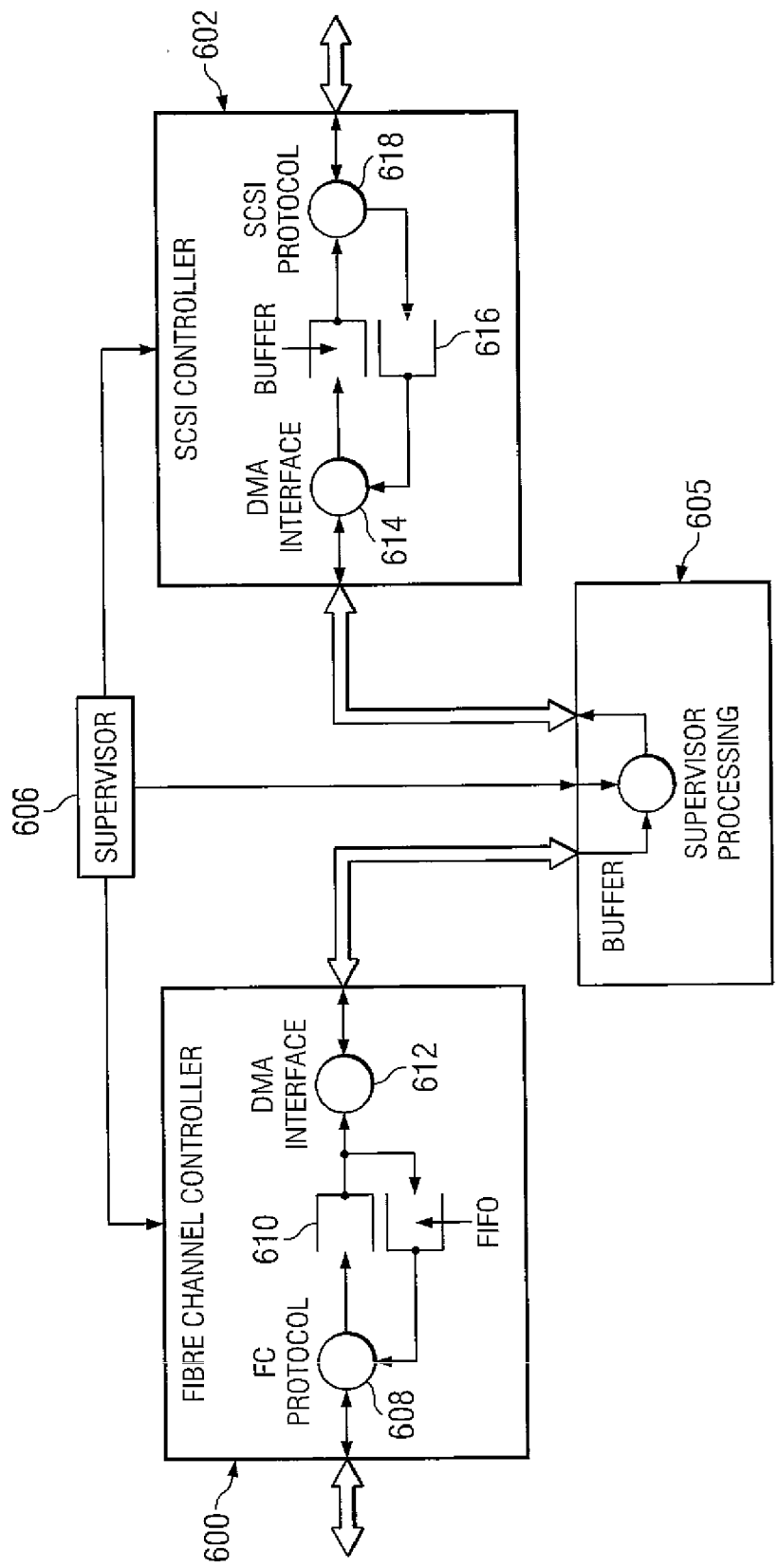
FIG. 7 is a block diagram of one embodiment of a data flow.

FIG. 7 is a block diagram of one embodiment of data flow within the storage router of FIG. 6. As shown, data from the first transport medium (e.g., the Fibre Channel transport medium) is processed by a protocol unit 608 (e.g., a Fibre Channel protocol unit) and placed in a FIFO queue 610. A direct memory access (DMA) interface 612 then takes data out of FIFO queue 610 and places it in buffer 604.

Supervisor unit 606 processes the data in buffer 604 as represented by supervisor processing 605. This processing can include mapping between the first transport medium and the second transport medium, applying access controls and routing functions. For example, supervisor unit 606 can map between Fibre Channel and SCSI, Fibre Channel and Fibre Channel, Fibre Channel and iSCSI or other protocols. A DMA interface 614 then pulls data from buffer 604 and places it into a buffer 616. A second protocol unit 618 pulls data from buffer 616 and communicates the data on the second transport medium (e.g., the SCSI bus). Data flow in the reverse direction, from the second transport medium to the first transport medium, is accomplished in a reverse manner.

In the example of FIGS. 6 and 7, the storage router can be a Fibre Channel to SCSI storage router that can act as a bridge device that connects a Fibre Channel link directly to a SCSI bus and enables the exchange of SCSI command set information between application clients on SCSI bus devices and the Fibre Channel links. Further, the storage router applies access controls such that virtual local storage can be established in remote SCSI storage devices for workstations on the Fibre Channel link. In one embodiment, the storage router provides a connection for Fibre Channel links running the SCSI Fibre Channel Protocol (FCP) to data transport elements or media changers on the SCSI bus. The Fibre Channel topology is typically an Arbitrated Loop (FC_AL).

The storage router can be attached to a Fibre Channel Arbitrated Loop and a SCSI bus to support a number of SCSI devices. Using configuration settings, the storage router can make the SCSI bus devices available on the Fibre Channel network as FCP logical units. Once the configuration is defined, operation of the storage router can be transparent to application clients.

In one implementation (not shown), the storage router can be a rack mount or free standing device with an internal power supply. The storage router can have a Fibre Channel and SCSI port, and a standard, detachable power cord can be used, the FC connector can be an optical Small Form Factor (SFF) connector, and the SCSI connector can be a VHDCI type. Additional modular jacks can be provided for a serial port and a 802.3 10 BaseT port, i.e. twisted pair Ethernet, for management access. The SCSI port of the storage router can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the storage router uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the storage router includes software as required to control functions of the various elements, execute the extended copy command, generate commands and provide appropriate translations between the FC and SCSI protocols.

The present invention, thus, provides a system and method for centralized partitioned library mapping. According to one embodiment, the present invention can include a first controller connected to a data transport element of a media library and a second controller connected to a media changer of the media library. The first controller can receive a command from a host application based on a media library partition presented to that host and forward the command to the second controller. The second controller can receive the command from the first controller, translate logical addresses referenced in the command to physical addresses and forward the command to the media changer. The second controller can also prioritize the command on a FIFO basis or according to other prioritization scheme known in the art.

Another embodiment of the present invention can include a plurality of storage routers. Each storage router from the plurality of storage routers can be connected to a data transport element of a media library and receive commands directed to a media changer based on a media library partition, and forward the command to another storage router. This embodiment of the present invention can also include an additional storage router connected to the media changer of the media library and each of the plurality of storage routers. The additional storage router can be configured to receive forwarded commands directed to the media changer from each of the plurality of storage routers, map logical addresses in the command to physical addresses and communicate the commands to the media changer.

Yet another embodiment of the present invention can include a method comprising receiving a command directed to a media changer based on a media library partition at a first controller, forwarding the command from the first controller to a second controller, translating logical addresses in the command to physical addresses and forwarding the command from the second controller to the media changer. This embodiment of the present invention can further include prioritizing commands at the second controller.

Yet another embodiment of the present includes a computer program device for media library mapping comprising a set of software instructions stored on one or more computer readable media, wherein the software instructions are executable by one or more processors to receive a command based on the media library partition, wherein the command is directed to a media changer, forward the command to a second controller, translate logical addresses in the command to physical addresses at the second controller and forward the command to the media changer.

Another embodiment of the present invention includes system comprising a media library that has a plurality of data transport elements and a media changer; a plurality of storage area networks; and a plurality of storage routers. Each of the plurality of storage routers can be connected to a storage area network from the plurality of storage area networks, a data transport element from the plurality of data transport elements and a control network. Moreover, each of the plurality of storage routers can be configured receive a command directed to the media changer based on a library partition via the storage area network to which it is connected and forward the command to another storage router via the control network. Additionally, the system can include an additional storage router connected to the control network and connected to the media changer. The additional storage router can be configured to receive commands directed to the media changer via the control network from the plurality of storage routers, translate logical addresses in the commands to physical addresses and forward the commands to the media changer on a FIFO basis.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

The invention claimed is:

1. A system of partitioned library mapping, comprising:
   a media library comprising:
      a plurality of data transport elements; and
      a media changer;
   a plurality of controllers, each controller connected to a data transport element of the media library, wherein each controller:
      presents a media library partition;
      receives a command from a host application directed to the media changer based on the media library partition, wherein the command references a logical address;
      forwards the command for prioritization;
      receives data; and
      forwards the received data to the data transport element; and
   a second controller connected to the media changer of the media library and each of the controllers, wherein the second controller:
      receives commands from the plurality of controllers;
      translates logical addresses in the commands to corresponding physical addresses based on media library partitions presented by the plurality of controllers;
      prioritizes the commands; and
      forwards the commands with the physical addresses to the media changer in accordance with the prioritization of the commands.

2. The system of claim 1, wherein the second controller prioritizes the commands on a FIFO basis.

3. The system of claim 1, wherein each controller is connected to a host by a first data transport medium and is connected to the data transport element of the media library via a second data transport medium.

4. The system of claim 3, wherein the first data transport medium operates according to a Fibre Channel protocol and the second data transport medium operates according to a SCSI protocol.

5. The system of claim 3, wherein the first data transport medium and the second data transport medium operate according to a Fibre Channel protocol.

6. The system of claim 3, wherein in the first data transport medium operates according to an iSCSI protocol.

7. The system of claim 3, wherein in the first data transport medium operates according to a serial attached SCSI protocol.

8. The system of claim 3, wherein the first data transport medium operates according to an Infiniband protocol.

9. The system of claim 3, wherein in the second data transport medium operates according to an iSCSI protocol.

10. The system of claim 3, wherein in the second data transport medium operates according to a serial attached SCSI protocol.

11. The system of claim 3, wherein the second data transport medium operates according to an Infiniband protocol.

12. The system of claim 3, wherein each controller is connected to the second controller via a third data transport medium.

13. The system of claim 12, wherein the third data transport medium is a TCP/IP network.

14. The system of claim 1, wherein the second controller:
   receives partitioning configuration information; and
   communicates a media library partition to a first controller of the plurality of controllers.

15. The system of claim 1, further comprising an additional computer running a configuration application connected to each controller of the plurality of controllers and the second controller, the additional computer being configured to receive partitioning configuration information and communicate the media library partition to the second controller.

16. A system of partitioned library mapping, comprising:
   a media library comprising:
      a plurality of data transport elements; and
      a media changer;
   a plurality of storage routers coupled to the plurality of data transport elements; and
   an additional storage router coupled to the media changer and to the plurality of storage routers, wherein each of the plurality of storage routers:
      presents a media library partition;
      receives commands directed to the media changer based on at least one media library partition; and
      forwards the commands directed to the media changer to the additional storage router; and
   wherein the additional storage router:
      receives forwarded commands directed to the media changer from each of the plurality of storage routers;
      translates logical addresses in the forwarded commands to physical addresses of the media library based on the at least one media library partition; and
      communicates the forwarded commands with the physical addresses to the media changer.

17. The system of claim 16, wherein the additional storage router prioritizes the forwarded commands.

18. The system of claim 17, wherein the additional storage router prioritizes the forwarded commands on a FIFO basis.

19. The system of claim 16, wherein each of the plurality of storage routers is connected to at least one host via a storage area network.

20. The system of claim 16, wherein each of the plurality of storage routers is a Fibre Channel to SCSI routing device.

21. The system of claim 16 wherein the additional storage router is a Fibre Channel to SCSI routing devices.

22. The system of claim 16, wherein each of the plurality of storage routers and the additional storage router are Fibre Channel to Fibre Channel storage routers.

23. The system of claim 16, wherein the additional routing device is connected to each of the plurality of routing devices via a control network.

24. The system of claim 16, further comprising an additional computer running a configuration application connected to each of the plurality of storage routers, the additional computer configured to receive partitioning configuration information and communicate the at least one media library partition to the additional routing device.

25. A method of partitioned library mapping comprising:
maintaining a first media library partition at a first controller connected to at least one data transport element of a media library;
presenting the first media library partition to a host application;
receiving a command from the host application based on the first media library partition, wherein the command is directed to a media changer of the media library, wherein the media changer is connected to a second controller;
forwarding the command from the first controller to the second controller;
translating logical addresses in the command to physical addresses of the media library; and
forwarding the command with the physical addresses from the second controller to the media changer.

26. The method of claim 25, wherein forwarding the command from the second controller to the media changer comprises forwarding the command with physical addresses to the media changer.

27. The method of claim 25, further comprising prioritizing the command before forwarding the command to the media changer.

28. The method of claim 25, further comprising forwarding the command from the second controller to the media changer on a FIFO basis.

29. The method of claim 25, further comprising:
establishing the first media library partition; and
communicating the first media library partition to the first controller.

30. The method of claim 29, further comprising establishing a set of media library partitions at the first controller.

31. A computer program device for media library mapping comprising a set of software instructions stored on one or more computer readable media, wherein the software instructions are executable by one or more processors to:
maintain a first media library partition at a first controller connected to at least one data transport element of a media library;
present the first media library partition to a host application;
receive a command from the host application based on the first media library partition, wherein the command is directed to a media changer of the media library, wherein the media changer is connected to a second controller;
forward the command from the first controller to the second controller;
translate at least one logical address referenced by the command to a physical address of the media library; and
forward the command with the physical address from the second controller to the media changer.

32. The computer program device of claim 31, wherein the software instructions are further executable to prioritize the command at the second controller.

33. The computer program device of claim 32, wherein the software instructions are further executable to prioritize the command on a FIFO basis.

34. The computer program device of claim 31, wherein the software instructions are further executable to:
establish a plurality of media library partitions; and
distribute the plurality of media library partitions to the second controller.

35. A system of media library mapping comprising:
a media library comprising:
a plurality of data transport elements; and
a media changer;
a plurality of storage area networks;
a plurality of storage routers, wherein each of the plurality of storage routers is connected to a storage area network from the plurality of storage area networks, to at least one data transport element from the plurality of data transport elements and to a control network, wherein each of the plurality of storage routers:
receives a command directed to the media changer via the storage area network based on a media library partition; and
forwards the command directed to the media changer to another storage router via the control network; and
an additional storage router connected to the control network and connected to the media changer, wherein the additional storage router:
receives commands directed to the media changer via the control network from the plurality of storage routers;
translates logical addresses in the commands to physical addresses of the media library;
prioritizes the commands; and
forwards the prioritized commands with the physical addresses to the media changer on a FIFO basis.

* * * * *